United States Patent
Lin et al.

(10) Patent No.: US 8,325,154 B2
(45) Date of Patent: *Dec. 4, 2012

(54) OPTICAL TOUCH CONTROL APPARATUS AND METHOD THEREOF

(75) Inventors: Cho-Yi Lin, HsinChu (TW); Yao-Ching Hsu, HsinChu (TW); Hui-Hsuan Chen, HsinChu (TW); Chin-Chou Lee, HsinChu (TW); Kuo-Hsiung Li, HsinChu (TW); Hsin-Chia Chen, HsinChu (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 331 days.

This patent is subject to a terminal disclaimer.

(21) Appl. No.: 12/069,965

(22) Filed: Feb. 13, 2008

(65) Prior Publication Data
US 2008/0259052 A1  Oct. 23, 2008

Related U.S. Application Data

(63) Continuation-in-part of application No. 11/737,899, filed on Apr. 20, 2007.

(30) Foreign Application Priority Data

Nov. 23, 2007 (TW) ................................ 96144652 A

(51) Int. Cl.
*G06F 3/042* (2006.01)

(52) U.S. Cl. ........................................ 345/175; 345/173

(58) Field of Classification Search .......... 345/173–178, 345/207; 178/18.01–18.07, 19.01–19.05
See application file for complete search history.

(56) References Cited

U.S. PATENT DOCUMENTS

| 4,507,557 | A | * | 3/1985 | Tsikos | 250/341.7 |
| 4,782,328 | A | * | 11/1988 | Denlinger | 341/5 |
| 6,803,906 | B1 | * | 10/2004 | Morrison et al. | 345/173 |
| 7,164,782 | B2 | * | 1/2007 | Baharav et al. | 382/124 |
| 2002/0113865 | A1 | * | 8/2002 | Yano et al. | 348/47 |
| 2003/0025897 | A1 | * | 2/2003 | Iwai | 356/71 |
| 2004/0046741 | A1 | * | 3/2004 | Low et al. | 345/166 |
| 2004/0208346 | A1 | * | 10/2004 | Baharav et al. | 382/124 |
| 2004/0208348 | A1 | * | 10/2004 | Baharav et al. | 382/124 |
| 2005/0168445 | A1 | * | 8/2005 | Piot et al. | 345/163 |
| 2005/0169506 | A1 | * | 8/2005 | Fenrich et al. | 382/127 |
| 2005/0226505 | A1 | * | 10/2005 | Wilson | 382/180 |
| 2005/0248540 | A1 | * | 11/2005 | Newton | 345/173 |

FOREIGN PATENT DOCUMENTS

CN  1358047 A   7/2002
JP  2002-062983  2/2002

* cited by examiner

*Primary Examiner* — Ricardo L Osorio
(74) *Attorney, Agent, or Firm* — Tung & Associates

(57) ABSTRACT

The present invention discloses an optical touch control apparatus, comprising: a light guide module having an optical information capturing position, the light guide module guiding light to the optical information capturing position, and generating optical information according to light input through or reflected from the optical information capturing position; and an image sensor module for sensing the optical information, and generating an electronic signal according to the optical information.

18 Claims, 5 Drawing Sheets

OPTICAL TOUCH CONTROL APPARATUS AND METHOD THEREOF

RELATED APPLICATIONS

The present invention is a continuation-in-part of U.S. Ser. No. 11/737,899 filed on Apr. 20, 2007.

FIELD OF INVENTION

The present invention relates to an optical touch control apparatus which generates a control signal by optically detecting the movement of an input device, and a method thereof.

BACKGROUND OF THE INVENTION

Touch-control apparatuses have become widely used in many applications, such as touchpad in a notebook computer, touch screen in an automatic teller machine, touch panel in a PDA or an electronic dictionary, etc. Presently there are resistance-type and capacitance-type touch control apparatuses. A resistance-type touch control apparatus senses the touched position by voltage drop; when its screen is touched, a circuit is conducted which results in a voltage drop in the horizontal axis and a voltage drop in the vertical axis. The amounts of the voltage drops are different depending on the touched position, and therefore the x-y coordinates of the touched position may be obtained. A capacitance-type touch control apparatus includes an ITO (Indium Tin Oxide) glass substrate. A uniform electric field is formed over its surface by discharging from its corners. When a conductive object, such as a human finger, conducts current away from the electric field, the lost amount of current may be used to calculate the x-y coordinates of the touched position.

SUMMARY

An object of the present invention is to provide a novel optical touch control apparatus which is neither resistance-type nor capacitance-type; it detects the movement of an input device by an optical approach. Thus, the input device does not have to exert pressure on a screen or a pad, nor does it have to be conductive. In addition, no complicated manufacturing process is required; the cost of the touch control apparatus according to the present invention is much lower than that of a resistance-type or capacitance-type touch control apparatus.

Another object of the present invention is to provide a method for controlling a touch control apparatus.

To achieve the above and other objects, and as disclosed by one embodiment of the present invention, an optical touch control apparatus comprises: a light guide module having an optical information capturing position, the light guide module guiding light to the optical information capturing position, and generating optical information according to light input through or reflected from the optical information capturing position; and an image sensor module for sensing the optical information, and generating an electronic signal according to the optical information.

Preferably, the optical touch control apparatus comprises an infrared light source. Also preferably, a lens module is interposed between the light guide module and the image sensor module. Moreover, the optical touch control apparatus may further comprise a feedback control circuit which controls illumination of the light source according to the optical information generated by the light guide module. Preferably, the electronic signal generated by the image sensor module may be processed by a processor circuit to generate an output signal for controlling a cursor, or for providing other functions, or for generating three-dimensional information.

In addition, according to another embodiment of the present invention, a method for controlling an optical touch control apparatus comprises: providing a light guide module having an optical information capturing position; causing the light guide module to generate optical information according to light input through or reflected from the optical information capturing position; and sensing the optical information, and generating an electronic signal according to the optical information.

BRIEF DESCRIPTION OF THE DRAWINGS

These and other features, aspects, and advantages of the present invention will become better understood with reference to the following description, appended claims, and accompanying drawings.

DESCRIPTION OF THE PREFERRED EMBODIMENTS

The drawings of the present invention are for illustrative purpose only; they are not drawn according to actual scale. It is intended for these drawings to show the functional relationship among the devices, rather than physical shape and structure. The optical touch control apparatus according to the present invention may be applied to touchpad, touch panel, touch screen, and other applications. As a matter of fact, for the optical touch control apparatus of the present invention to work, it does not require "touching". The term "touch control apparatus" is used in the context of the specification to imply that the present invention provides an alternative for the conventional touch control apparatus. It does not mean that the apparatus according to the present invention detects the position of an input device by its touching.

Figure 1:
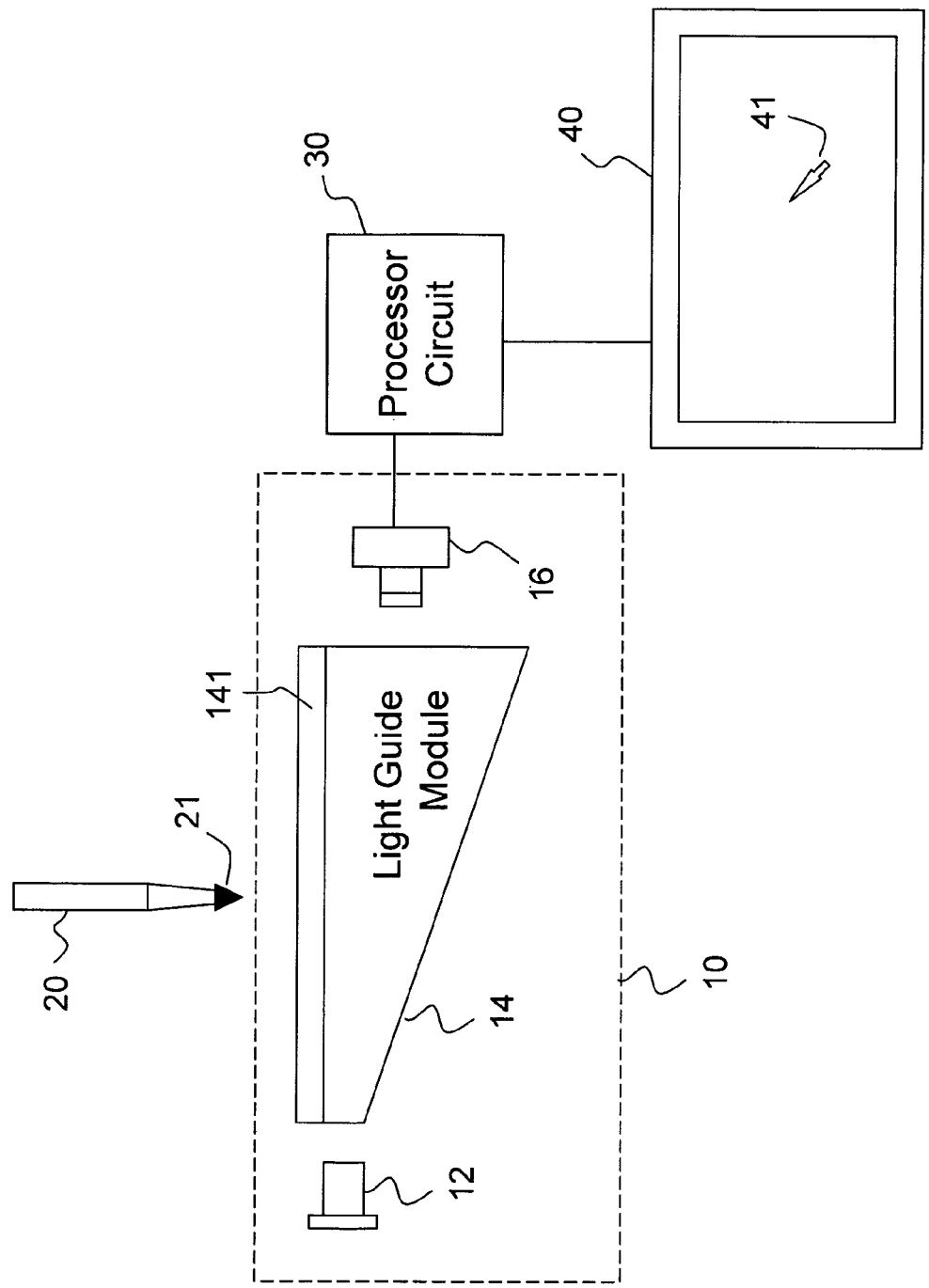
FIG. 1 shows a first embodiment according to the present invention.

Referring to FIG. 1, the optical touch control apparatus 10 according to the present invention basically comprises a light source 12, a light guide module 14, and an image sensor module 16. Where necessary, an input device 20 is provided outside the touch control apparatus 10. The input device 20 may be any object such as a finger, a pen-shape object, or the like. It does not have to be a dedicated component of the touch control apparatus, nor does it have to be conductive. The light source 12 projects light into the light guide module 14. The light source 12 may be arranged at any suitable location other than the location shown in the figure, such as on top of the touch surface 141. The light source 12 may even be omitted if there is enough natural light. However, preferably, an infrared light source 12 is provided for stability of the performance. The light guide module 14 transmits the optical information of the movement of the input device 20 to the image sensor module 16. A light guide may be made by plastic injection molding technique, ink-jet technique, or imprint technique, as well known by those skilled in this art, the details of which are omitted here. As an example, a prism is a simple form of light guide module 14. In a more sophisticated form, the light guide module 14 includes a light guide (not shown) which transforms the linear light projected from the light source 12 into planar light, and projects the planar light uniformly to the touch surface 141. In addition, the light guide module 14 transmits light input through, or reflected from the touch surface 141 to the image sensor module 16, so that the image sensor module 16 may capture optical information relating to the movement of the input device 20. Preferably, the front end 21 of the input device 20 may be made of, or covered by a reflective material, so that the optical information captured by the image sensor module 16 is more accurate. The input device 20 needs not lay any pressure on the touch surface 141, so it does not necessarily have to "touch" the touch surface 141. Similar to the reason for using the term "touch control apparatus", the term "touch surface" used in the context of the specification is to imply that it provides a similar function to that of the "touch pad", "touch panel", or the like, but does not require any physical contact between the input device 20 and the touch surface 141.

The image sensor module 16 transfers the optical information into electronic signals and sends the signals to a processor circuit 30. Depending on the application of the optical touch control apparatus 10, the output signals of the processor circuit 30 may be used to provide different functions, such as to control cursor 41 movements on a display screen 40, when the optical touch control apparatus 10 is used as a touchpad in a notebook computer; or, to initiate an electronic transaction such as fund transfer, when the optical touch control apparatus 10 is used as a touch screen in an automatic teller machine.

Figure 2:
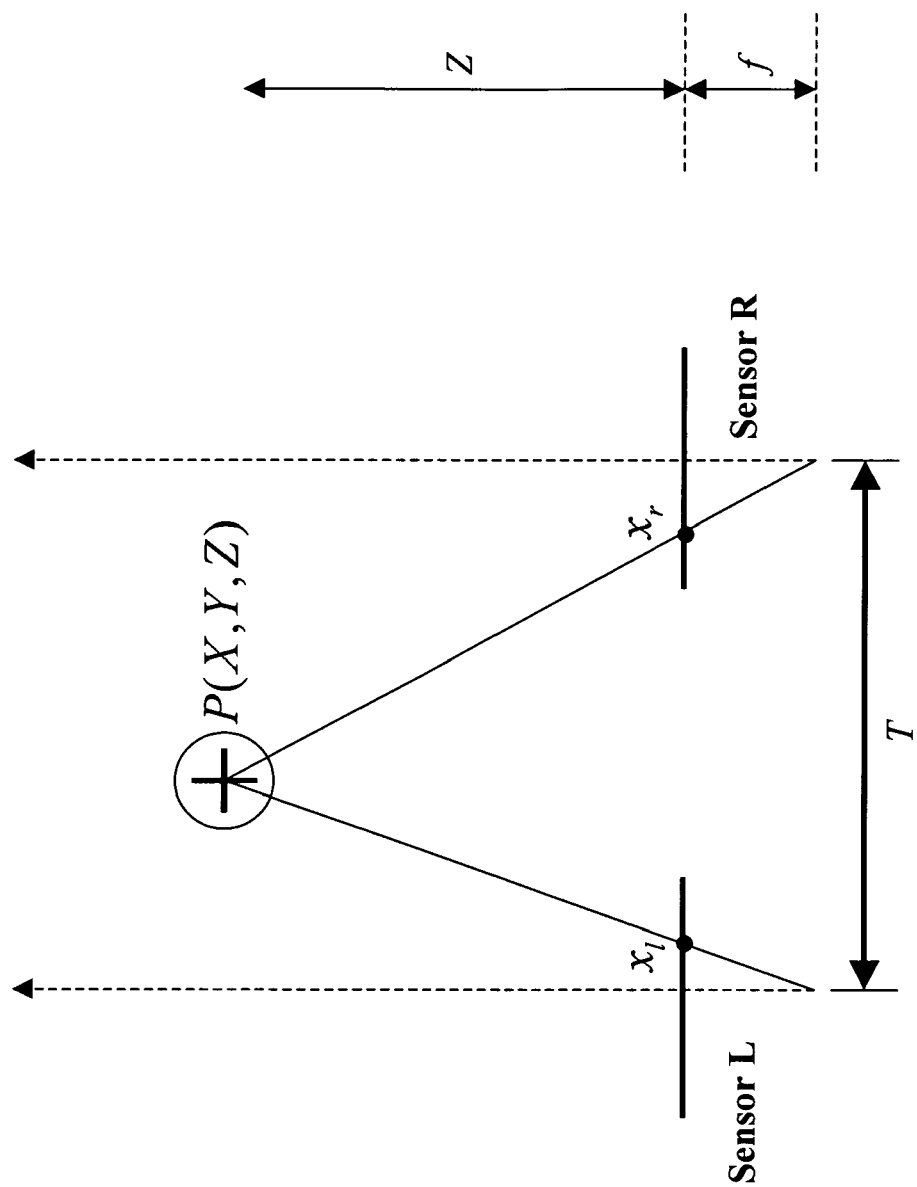
FIG. 2 explains how to calculate three-dimensional information.

The optical information captured by the image sensor module 16 is two-dimensional; this is sufficient for controlling the movements of the cursor 41. However, if it is desirous to provide other functions according to the three-dimensional movement of the input device 20, such as to select an option from a menu displayed on a screen, it can be arranged as follows. Two or more image sensors can be provided in the image sensor module 16, and the three-dimensional movement of the input device 20 can be obtained from the captured images, the relative distance between two image sensors, and the focal distance of the image sensors. More specifically, as shown in FIG. 2, assuming that the distance between the center locations of the two image sensors is T; the focal distance of each of the image sensors is f; the captured image includes an object, and the object's horizontal position as seen from the left sensor is Xl, while its horizontal position as seen from the right sensor is Xr (Xr is a negative value since it is located at the left side of the right sensor); and the projected distance between the object and each of the sensors is Z; it can thus be obtained that $x_l/f=X/Z$, and $-x_r/f=(T-X)/Z$ Thus, the coordinates of the object can be obtained as:

$X=(T \times x_l)/(x_l-x_r)$ $Y=(T \times y_l)/(x_l-x_r)$ (wherein $y_l$ is not shown in the figure)

$Z=f \times [T/(x_l-x_r)]$

It should be noted that the above is only one among many possible ways to calculate the three-dimensional information of the input device 20. The calculation of the three-dimensional information may be done by other ways, as those skilled in this art may conceive under the teaching by the present invention. The key point is that the present invention provides one more dimension, and thus more functions that can be achieved, as compared with the conventional touch control apparatus.

Figure 3:
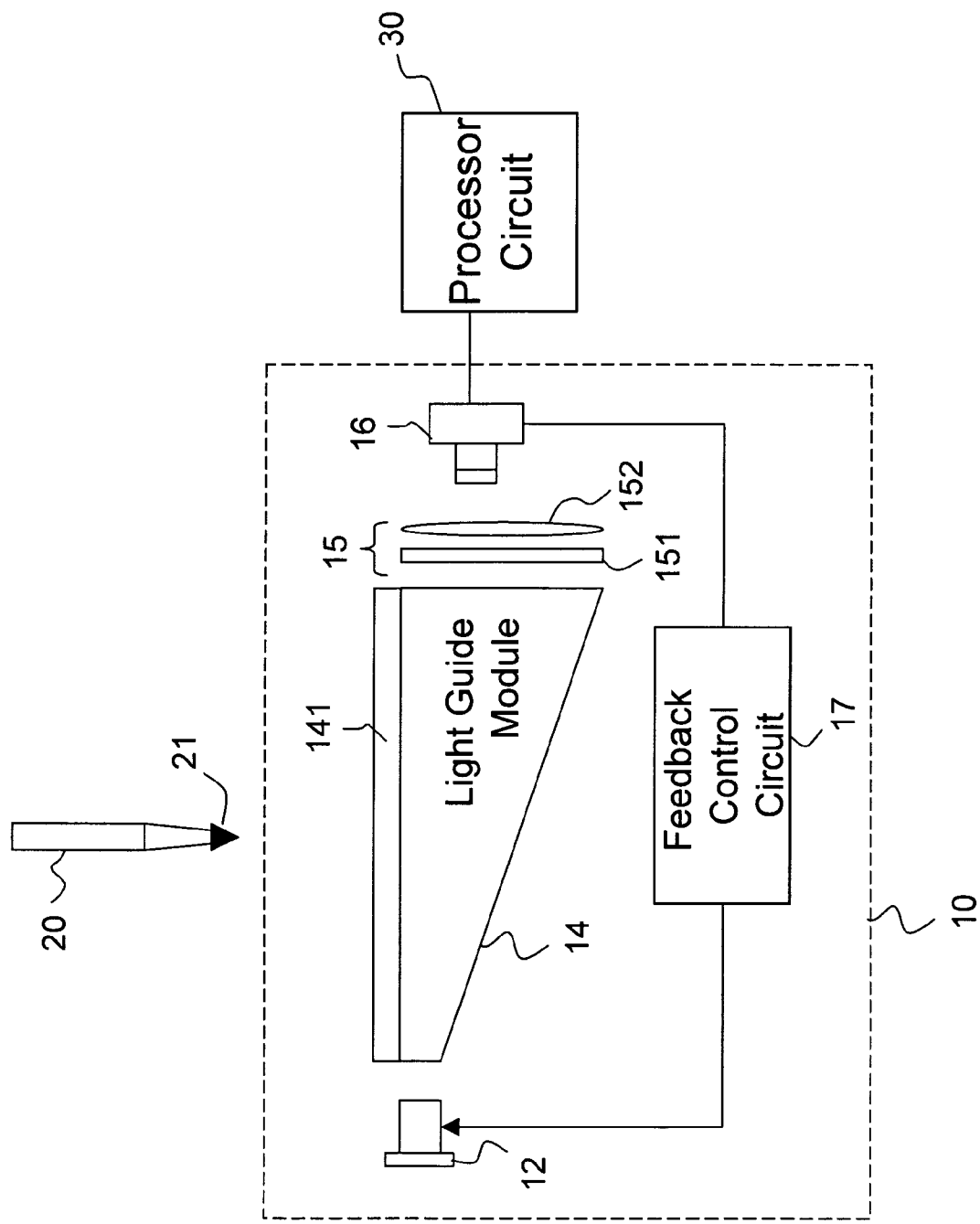
FIG. 3 shows a second embodiment according to the present invention.

Referring to FIG. 3 which is another embodiment according to the present invention, the optical touch control apparatus 10 according to this embodiment comprises, in addition to the light source 12, the light guide module 14, and the image sensor module 16, a lens module 15 and a feedback control circuit 17. The lens module 15 includes one or more lenses 151, 152, to assist the image sensor module 16 to capture an image more precisely. The feedback control circuit 17 adjusts the illumination of the light source 12. When the light sensed by the image sensor module 16 is too weak that the captured image is not clear enough, the feedback control circuit 17 automatically adjusts the illumination of the light source 12 according to the condition of the image sensor module 16.

Figure 4:
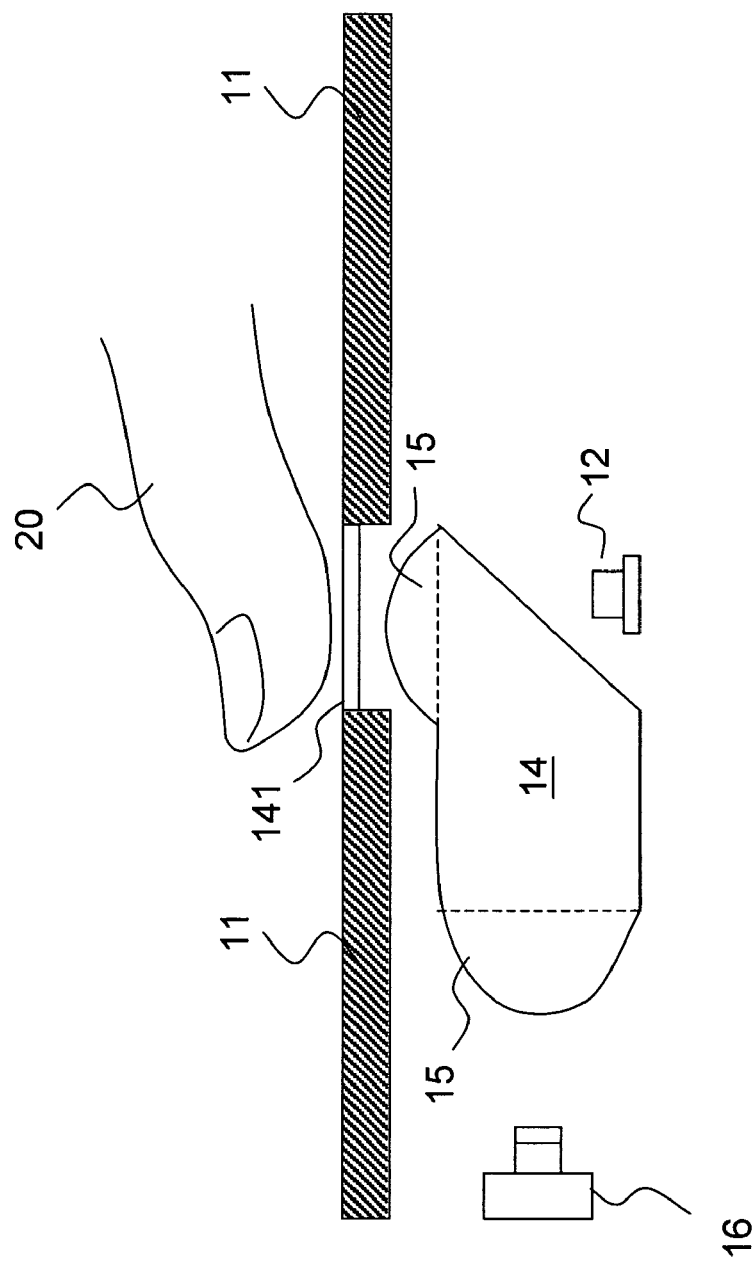
FIG. 4 shows a third embodiment according to the present invention.

In FIGS. 1 and 3, the input device 20 is shown to be much smaller than the touch surface 141, but this is not necessarily so. FIG. 4 shows another embodiment of the present invention, in which the input device 20 (a human finger, for example) covers most or almost all of the surface area of the touch surface 141. 2-dimensional or 3-dimensional information can be generated by detecting the movement of the surface pattern of the input device 20 (such as the variation of the finger print pattern), for controlling cursor movement, selecting an item from a menu, etc. Because the input device 20 covers most of the surface area of the touch surface 141, in some cases it is even not required to provide a touch surface 141 at the designated location; that is, the designated location can simply be an opening on the housing 11. Regardless it is a touch surface 141 or an opening, the designated location is a place for capturing optical information. In one embodiment, the touch surface 141 is provided more for the reason to prevent external dust from falling into the housing 11 than to assist determining the movement of the input device 20. In another embodiment, the touch surface 141 is a part of a physical contact button for other control functions, and less critical as a device to assist determining the movement of the input device 20.

In the embodiment of FIG. 4, for further reducing the overall size of the optical touch control apparatus, the light guide module 14 and the lens module 15 are integrated as one module. However, of course, these two modules can be two separate devices, if required. Alternatively, the lens module 15 can be omitted in some cases.

Figure 5:
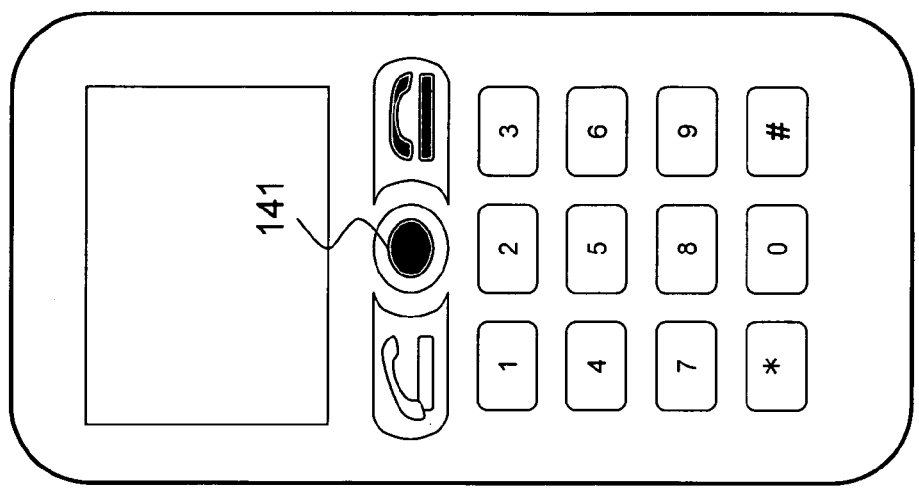
FIG. 5 shows an application of the third embodiment in a mobile phone.

The optical touch control apparatus of FIG. 4 can be applied to portable electronic devices such as mobile phone, PDA (personal digital assistant), portable music player, etc. FIG. 5 shows that the optical touch control apparatus (not completely shown) is provided in a mobile phone, and the touch surface 141 (or the opening) is provided below the display screen and above the keypads.

The spirit of the present invention has been explained in the foregoing with reference to its preferred embodiments, but it should be noted that the above is only for illustrative purpose, to help those skilled in this art to understand the present invention, not for limiting the scope of the present invention. Within the same spirit, various modifications and variations can be made by those skilled in this art. For example, additional devices may be interposed between any two devices shown in the drawings; the processor circuit 30, although shown as an external device to the optical touch control apparatus 10, may be integrated into the optical touch control apparatus 10; the input signal of the feedback control circuit 17 may come from the processor circuit 30 instead of the image sensor module 16, etc. In view of the foregoing, it is intended that the present invention cover all such modifications and variations, which should interpreted to fall within the scope of the following claims and their equivalents.

What is claimed is:

1. An optical touch control apparatus, comprising:
   a light source projecting light;
   a light guide module having an optical information capturing position on a working surface, the light guide module guiding the light projected from the light source to the optical information capturing position, and generating optical information according to light input through or reflected from the optical information capturing position, wherein the optical information relates to movement of an input device;
   an image sensor module for sensing the optical information, and generating an electronic signal according to the optical information, wherein the image sensor module is located at a lateral side of the light guide module; and
   a lens module including a first lens interposed between the optical information capturing position and the light guide module, and a second lens interposed between and the light guide module and the image sensor module, wherein the lens module and the light guide module are integrated as one piece, and the lens module focuses light passing through the lens module;
   wherein the light guide module includes a bevel at a side opposing to the optical information capturing position, the bevel having a relative angle with respect to the working surface such that at least part of the light projected from the light source is transmitted through the bevel to reach the optical information capturing position and reflected from the optical information capturing position to reach the bevel, and at least part of the light reflected from the optical information capturing position to reach the bevel is reflected by the bevel to the image sensor module.

2. The apparatus as claimed in claim 1, wherein the light source is an infrared light source and projects linear light.

3. The apparatus as claimed in claim 2, wherein the light guide module has a trapezoidal cross section and transforms the light projected from the light source into planar light.

4. The apparatus as claimed in claim 1, wherein said electronic signal is sent to a processor circuit to generate three-dimensional information.

5. The apparatus as claimed in claim 4, wherein the image sensor module includes at least two image sensors having a relative distance T therebetween, each image sensor having a focal distance f, and wherein said three-dimensional information (X, Y, Z) is obtained by $$X=(T \times x_l)/(x_1-x_r);$$

$$Y=(T \times y_l)/(x_1-x_r);\text{ and}$$

$$Z=f \times [T/(x_l-x_r)],$$

wherein $x_l$ and $y_l$ are two-dimensional coordinates obtained by one image sensor, and $x_r$ and $y_r$ are two-dimensional coordinates obtained by the other image sensor.

6. The apparatus as claimed in claim 1, wherein the input device includes a portion made of a reflective material.

7. The apparatus as claimed in claim 1, further comprising a feedback control circuit which controls illumination of the light source according to the optical information generated by the light guide module.

8. The apparatus as claimed in claim 7, wherein said feedback control circuit receives signals from the image sensor module or from the processor circuit.

9. The apparatus as claimed in claim 1, wherein the optical information capturing position is an opening.

10. The apparatus as claimed in claim 1, wherein the optical information capturing position is a surface, and the surface is a part of a physical contact button.

11. The apparatus as claimed in claim 1, wherein the optical information capturing position has an area most of which is coverable by a finger or an input device.

12. A method for controlling an optical touch control apparatus, comprising:
    projecting light;
    providing a light guide module having a working surface on which is provided an optical information capturing position, the light guide module guiding the projected light to the optical information capturing position, wherein the light guide module includes a bevel at a side opposing to the optical information capturing position, the bevel having a relative angle with respect to the working surface such that at least part of the projected light is transmitted through the bevel to reach the optical information capturing position and reflected from the optical information capturing position to reach the bevel, and at least part of the light reflected from the optical information capturing position to reach the bevel is reflected by the bevel to a lateral side of the light guide module, wherein the optical information relates to movement of an input device;
    causing the light guide module to generate optical information according to light input through or reflected from the optical information capturing position; and
    sensing the optical information by an image sensor from the lateral side of the light guide module, and generating an electronic signal according to the optical information,
    wherein the light guide module is integrated with a lens module as one piece, the lens module including a first lens interposed between the optical information capturing position and the light guide module, and a second lens interposed between the light guide module and where the optical information is sensed, and the lens module focusing light passing through the lens module.

13. The method as claimed in claim 12, wherein the projected light is linear infrared light, and the light guide module has a trapezoidal cross section, the light guide module transforming the linear infrared light into planar infrared light.

14. The method as claimed in claim 13, further comprising: generating a feedback signal according to the optical information, to control the illumination of the infrared light.

15. The method as claimed in claim 12, further comprising: controlling a cursor on a display according to the electronic signal.

16. The method as claimed in claim 12, further comprising: controlling three-dimensional information according to the electronic signal.

17. The method as claimed in claim 12, further comprising: moving the input device on or above the optical information capturing position of the light guide module, the input device being at least partially made of a reflective material.

18. The method as claimed in claim 12, wherein the optical information capturing position has an area most of which is coverable by a finger or an input device.

* * * * *